United States Patent [19]
Shibata et al.

[11] Patent Number: 5,418,646
[45] Date of Patent: May 23, 1995

[54] WIDE-ANGLE ZOOM LENS SYSTEM HAVING A HIGH VARIFOCAL RATIO

[75] Inventors: Hironori Shibata; Atsujiro Ishii, both of Tokyo, Japan

[73] Assignee: Olympus Optical Co., Ltd., Tokyo, Japan

[21] Appl. No.: 98,821

[22] Filed: Jul. 29, 1993

[30] Foreign Application Priority Data

Jul. 30, 1992 [JP] Japan .................................. 4-222292

[51] Int. Cl.⁶ ........................ G02B 15/14; G02B 13/18
[52] U.S. Cl. ..................................... 359/687; 359/708
[58] Field of Search ............................. 359/687, 708

[56] References Cited
FOREIGN PATENT DOCUMENTS 3200113  9/1991  Japan .
3215810  9/1991  Japan .

*Primary Examiner*—Scott J. Sugarman
*Attorney, Agent, or Firm*—Cushman, Darby & Cushman

[57] ABSTRACT

A zoom lens system comprising, in order from the object side, a first lens unit which has a positive refractive power and is kept fixed during zooming, a second lens unit which has a negative refractive power, is movable for zooming and has a vari-focal function, a third lens unit which has a positive refractive power and is movable for zooming, and a fourth lens unit which has a positive refractive power and is movable for zooming; a location of the third lens unit at a tele position of the zoom lens system being on the object side of a location of the third lens unit at a wide position of the zoom lens system. This zoom lens system consists of a small number of lens components, and has a vari-focal ratio of 9 to 12 and a wide field angle of 65° to 68° at the wide position thereof.

6 Claims, 12 Drawing Sheets

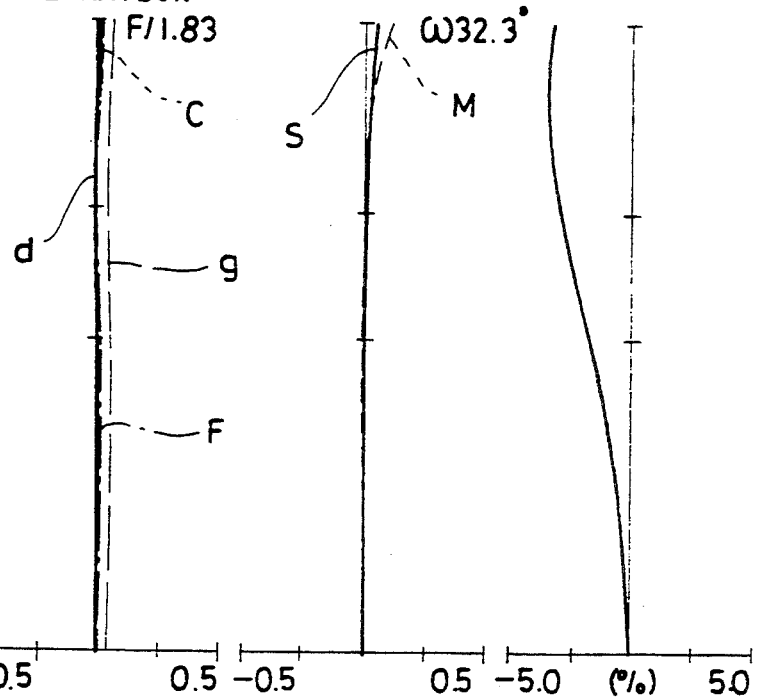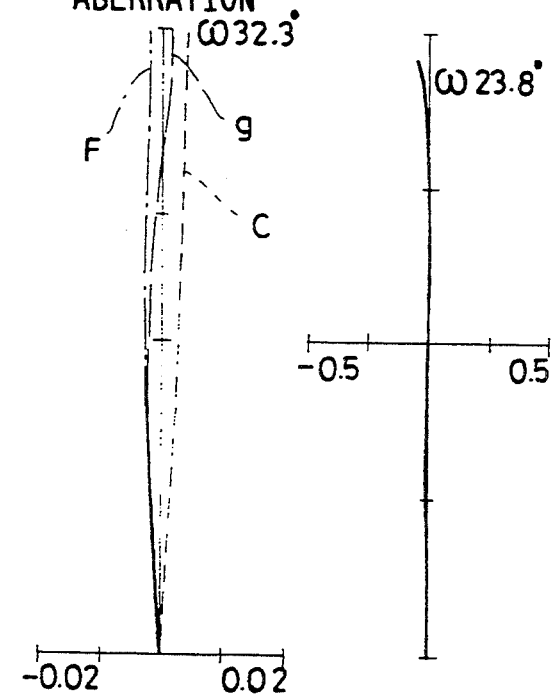

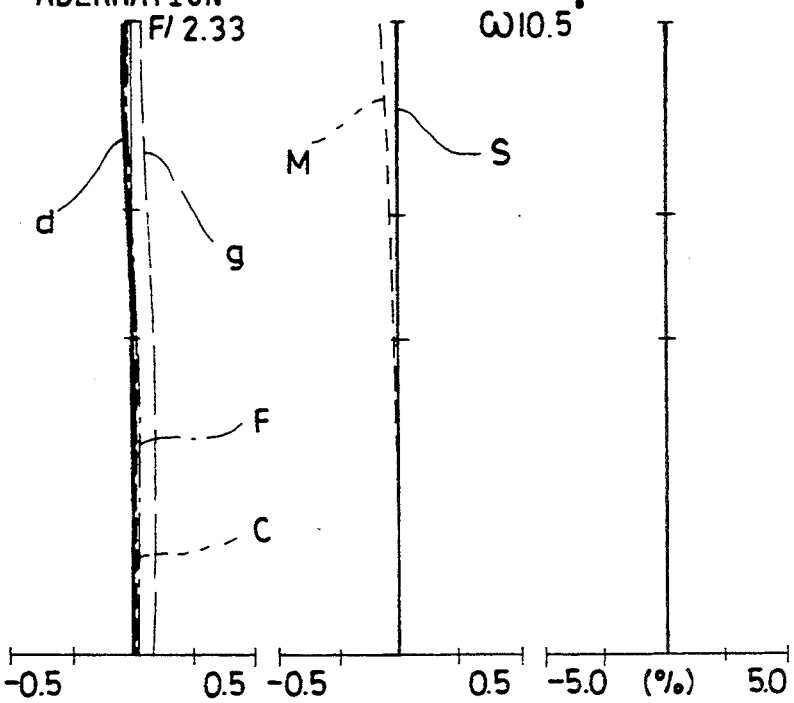
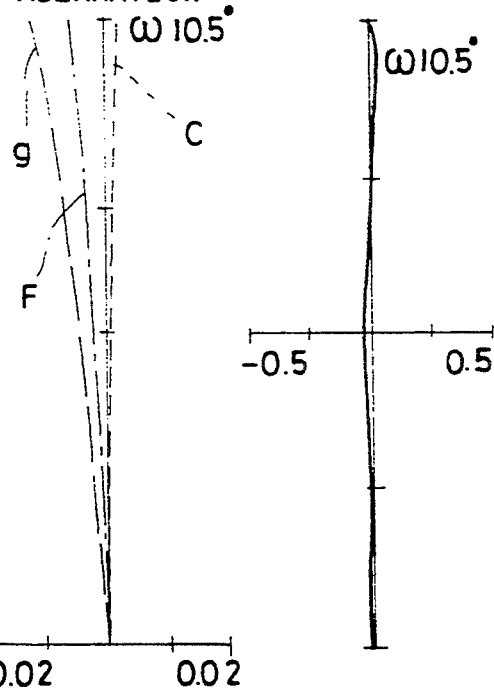

FIG. 6A
SPHERICAL ABERRATION

F/2.43
F, d, g, C

FIG. 6B
ASTIGMATISM

ω 3.0°
S, M

FIG. 6C
DISTORTION

-0.5   0.5   -0.5   0.5   -5.0 (%)   5.0

FIG. 6D
LATERAL CHROMATIC ABERRATION

ω 3.0°
g, F, C

-0.02   0.02

FIG. 6E
COMA

ω 2.1°

-0.5   0.5

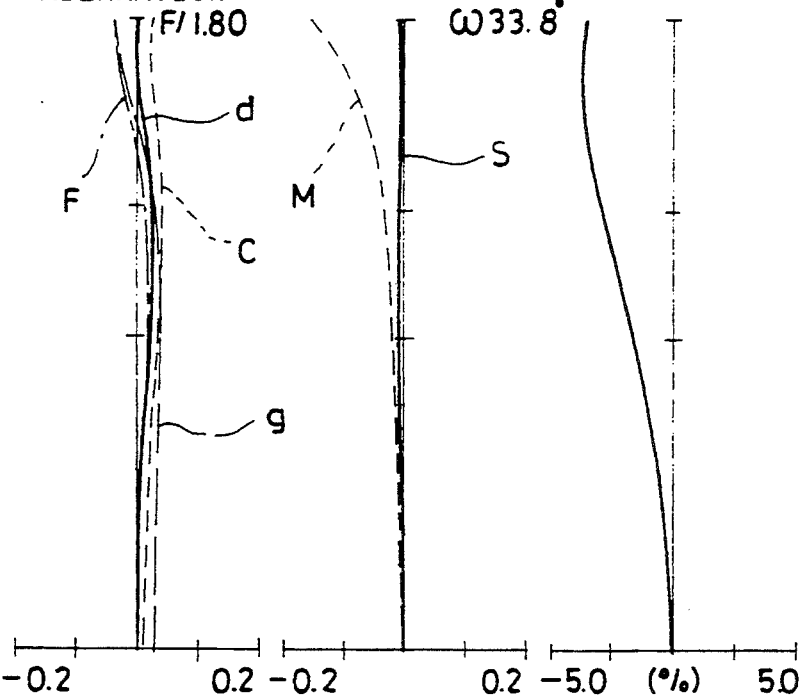
FIG. 7A SPHERICAL ABERRATION
FIG. 7B ASTIGMATISM
FIG. 7C DISTORTION
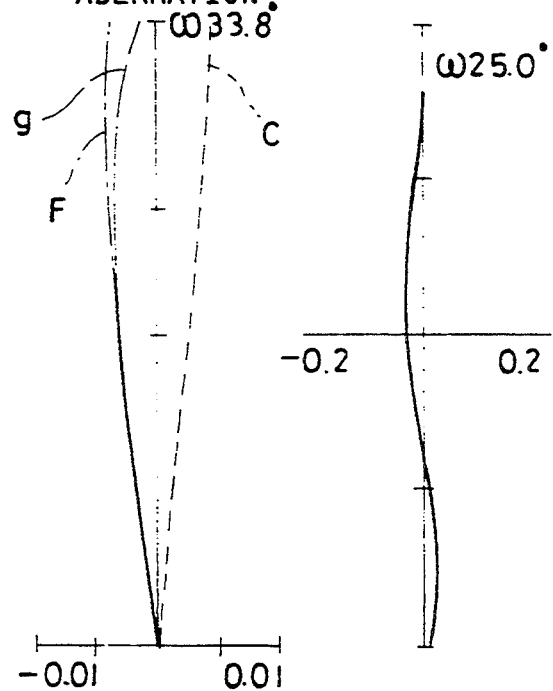
FIG. 7D LATERAL CHROMATIC ABERRATION
FIG. 7E COMA

FIG. 8A
SPHERICAL
ABERRATION
F/2.05

FIG. 8B
ASTIGMATISM
ω 12.6°

FIG. 8C
DISTORTION

FIG. 8D
LATERAL
CHROMATIC
ABERRATION
ω 12.6°

FIG. 8E
COMA
ω 9.0°

FIG. 9A SPHERICAL ABERRATION
FIG. 9B ASTIGMATISM
FIG. 9C DISTORTION
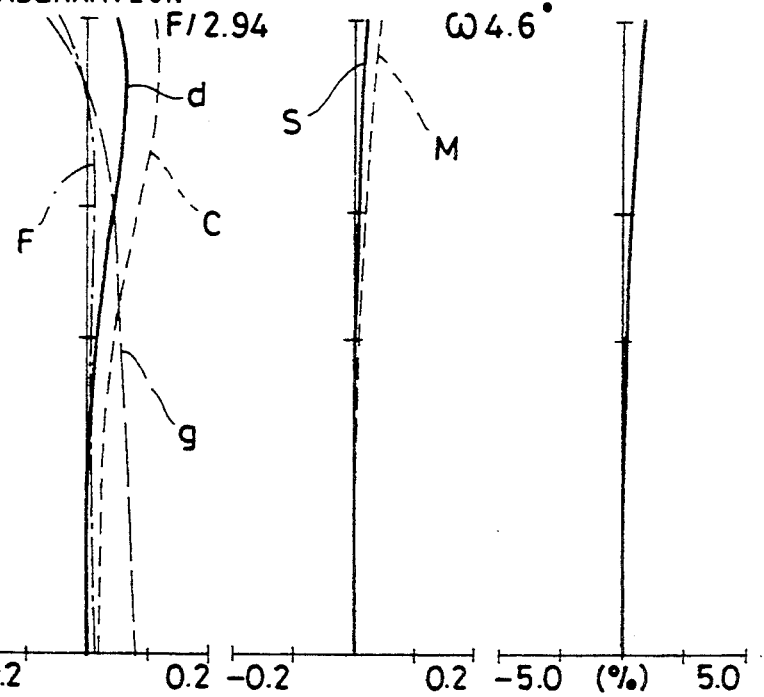
FIG. 9D LATERAL CHROMATIC ABERRATION
FIG. 9E COMA
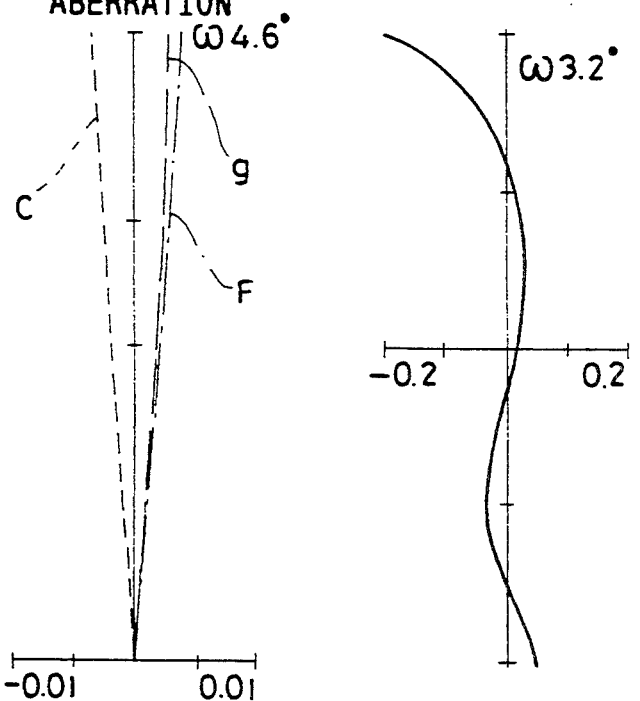

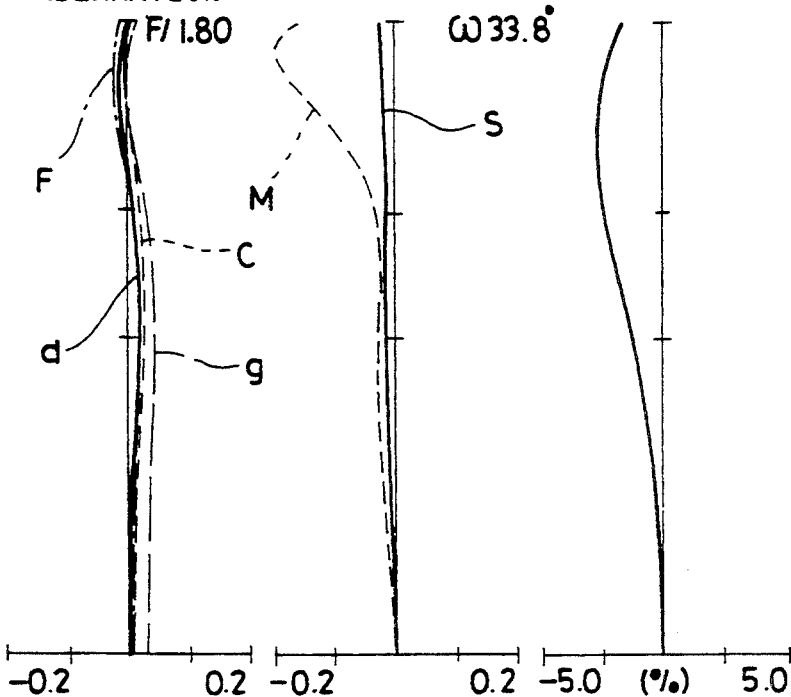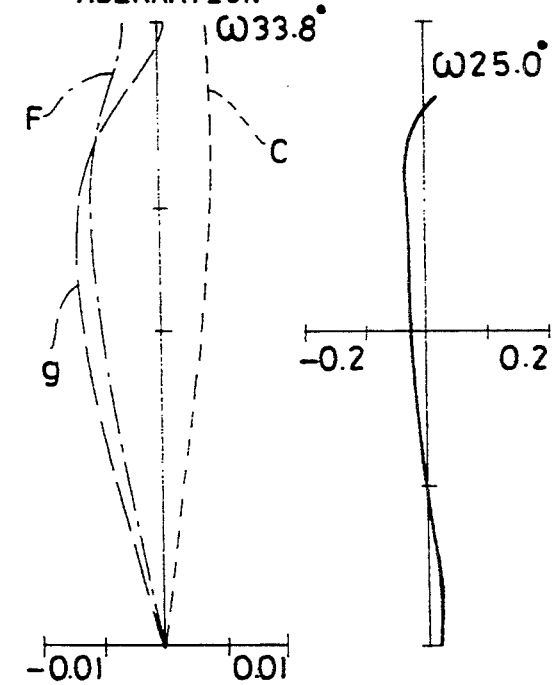

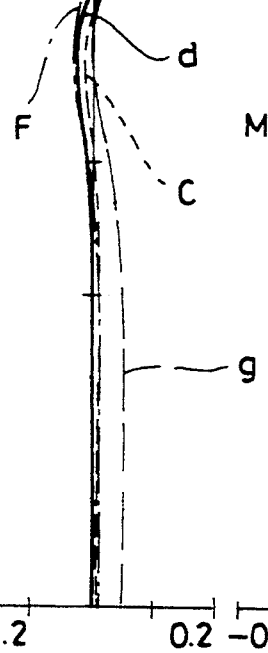

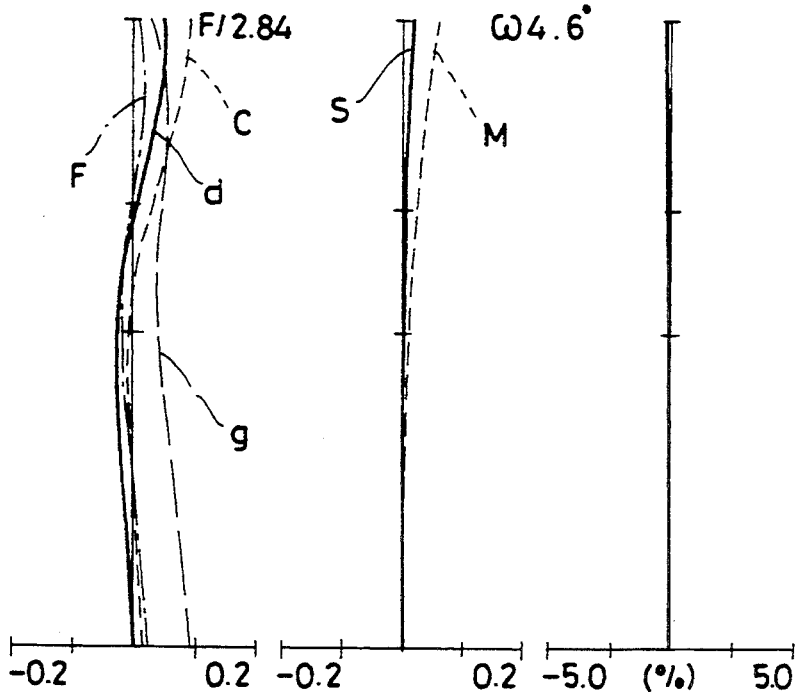
FIG. 12A SPHERICAL ABERRATION
FIG. 12B ASTIGMATISM
FIG. 12C DISTORTION
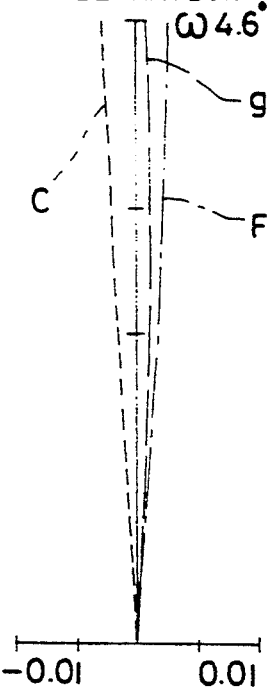
FIG. 12D LATERAL CHROMATIC ABERRATION
FIG. 12E COMA

WIDE-ANGLE ZOOM LENS SYSTEM HAVING A HIGH VARIFOCAL RATIO

BACKGROUND OF THE INVENTION

1. Field of the invention

The present invention relates to a zoom lens system which is suited for use with video cameras.

2. Description of the prior art

In the recent years, there are produced strong demands for zoom lens systems which are to be used with video cameras. Further, it has conventionally been desired to configure zoom lens systems so as to be compacter. Furthermore, it is increasingly demanded to configure zoom lens systems so as to have wider field angles and higher vari-focal ratios. Out of the conventional zoom lens systems which are to be used with video cameras, the demands or requirements described above are satisfied only by a zoom lens system disclosed by Japanese Patent Kokai Publication No. Hei 3-215,810. However, this zoom lens system has a vari-focal ratio on the order of 8 and a half field angle on the order of 56° which cannot be said as a sufficiently high vari-focal ratio and a sufficiently wide field angle respectively.

The conventional zoom lens systems have compositions which do not permit obtaining a higher vari-focal ratio or a wider field angle.

SUMMARY OF THE INVENTION

A primary object of the present invention is to provide a zoom lens system which is compact in a size thereof, comprises a small number of lens components, and has a vari-focal ratio of 8 to 12 and a wide field angle of $2\omega = 65°$ to $68°$.

The zoom lens system according to the present invention comprises, in order from the object side, a first lens unit which has a positive refractive power and is kept fixed during zooming, a second lens unit which has a negative refractive power, is movable for zooming and has a vari-focal function, an aperture stop, a third lens unit which has a positive refractive power and is movable for zooming, and a fourth lens unit which has a positive refractive power and is movable for zooming. The zoom lens system according to the present invention is configured so as to satisfy the following condition (1):

(1) $0.5 < |x_{3W} - x_{3T}|/f_W < 3$ wherein the reference symbol $x_{3W}$ and $x_{3T}$ represent locations of the third lens unit on an optical axis at a wide position and a tele position respectively of the zoom lens system, and the reference symbol $|x_{3W} - x_{3T}|$ designates a difference in distance between the locations of the third lens unit on the optical axis at the wide position and the tele position. Further, the reference symbol $f_W$ denotes a focal length of the zoom lens system as a whole at the wide position thereof.

In case of a zoom lens system which consists of a positive lens unit, a negative lens unit, a positive lens unit and a positive lens unit, it is generally sufficient for enhancing a vari-focal ratio thereof to select either of two methods described below:

One of the method is to strengthen a refractive power of a vari-focal lens unit. In this case, however, spherical aberration, coma, etc. are aggravated, thereby delimiting enhancement in a vari-focal ratio of the zoom lens system.

The other method is to prolong a moving distance of the vari-focal lens unit for changing a magnification of the zoom lens system. In this case, lens unit or lens units which are disposed before an aperture stop must be moved for a prolonged distance or distances, whereby a distance as measured from a first lens unit to the aperture stop is prolonged, an off axial ray is incident on the first lens unit at a larger height particularly within a region from a wide position to an intermediate field angle of the zoom lens system and a front lens component disposed in the zoom lens system has a large diameter.

The present invention has succeeded in correcting this defect by configuring the zoom lens system so as to use the third lens unit which is movable and satisfy the above-mentioned condition (1). Speaking more concretely, the third lens unit which is disposed on the image side of the aperture stop is moved toward the object side along the optical axis from the wide position to the tele position so that the zoom lens system satisfies the condition (1) and the third lens unit has a strong vari-focal function. Owing to the movement and the function of the third lens unit described above, the zoom lens system according to the present invention makes it possible to shorten a moving distance of the second lens unit which is required for changing a magnification of the zoom lens system and use a compact front subsystem which is to be disposed before the aperture stop.

If the upper limit of the condition (1) is exceeded, heights of incident rays will be too high on the third lens unit in particular at the wide position of the zoom lens system, thereby making it difficult to correct aberrations. If the lower limit of the condition (1) is exceeded, in contrast, it will undesirably be impossible to configure the zoom lens system so as to be compact.

It is preferable that the third lens unit is moved unidirectionally for zooming the zoomlens system from the wide position to the tele position thereof, and that the fourth lens unit is moved along the optical axis independently of the third lens unit so that an airspace reserved between the third lens unit and the fourth lens unit at the tele position is wider than that at the wide position for an object point located at infinite distance. The movements of the third lens unit and the fourth lens unit described above makes it possible to reserve a long distance between the third lens unit and the fourth lens unit within a telephoto region wherein the zoom lens system is to be moved for a prolonged distance for focusing, effectively utilize spaces in the zoom lens system, and obtain an advantage for configuring the zoom lens system compact.

The object of the present invention can be accomplished by defining the moving distance of the third lens unit within the range described above, and the zoom lens system can have a higher vari-focal ratio, a wider field angle and a compacter size by contriving the movement of the third lens unit which is performed in conjunction with the fourth lens unit. For obtaining such a higher vari-focal ratio and a wider field angle of the zoom lens system, it is desirable to configure the lens units so as to satisfy the following conditions (2) and (3):

(2) $0.1 < |f_2|/f_1 < 0.4$ (3) $0.77 < f_4/f_3 < 2$ wherein the reference symbols $f_1$, $f_2$, $f_1$ $_{and}$ $f_4$ represents focal lengths of the first lens unit, the second lens unit, the third lens unit and the fourth lens unit respectively.

The condition (2) defines a ratio of the focal length of the second lens unit relative to that of the first lens unit. Speaking concretely, it is possible, by prolonging the focal length of the first lens unit and shortening the focal length of the second lens unit, to widen an angle formed between the optical axis and principal rays which are incident on the first lens unit and to emerge from the second lens unit at the same angle, thereby widening a field angle of the zoom lens system. If the upper limit of the condition (2) is exceeded, it will therefore be undesirable for widening the field angle of the zoom lens system. If the lower limit of the condition (2) is exceeded, in contrast, the second lens unit will have too strong a refractive power, thereby aggravating negative curvature of field, spherical aberration and so on.

It is more effective for widening the field angle of the zoom lens system to adopt, in place of the condition (2), the following condition (2') which has an upper limit of 0.22:

(2') $0.1 < |f_2|/f_1 < 0.22$

It is more desirable for correcting positive curvature of field, positive spherical aberration and so on to strengthen a refractive power of the second lens unit as defined by the condition (2').

The condition (3) defines a ratio of the focal length of the fourth lens unit relative to that of the third lens unit. So far as a moving distance of the third lens unit remains unchanged, the zoom lens system can have a higher vari-focal ratio by strengthening the refractive power of the third lens unit. Further, variations of aberrations which are to be caused by moving the fourth lens unit can desirably be reduced by making marginal rays emerging from the third lens unit nearly parallel with the optical axis, or nearly afocal.

If the upper limit of the condition (3) is exceeded, rays emerging from the third lens unit will undesirably be converged. If the lower limit of the condition (3) is exceeded, in contrast, it will undesirably be impossible to configure the zoom lens system compact.

When it is desired to configure the zoom lens system compacter, for example, along with adoption of a compacter image pickup device, the zoom lens system must be configured compacter. Due to restrictions imposed from viewpoints of manufacturing and assembly of the lens units, it is impossible to use positive lens components and negative lens components having thickness of marginal portions and thickness in the vicinities of the optical axis which exceed certain limits. Accordingly, a ratio of a total of thickness of the lens components relative to a total length of the zoom lens system is unavoidably high and airspaces which are to be reserved for moving the lens components are narrowed, thereby making it impossible to obtain a sufficiently high vari-focal ratio and correct aberrations favorably.

For configuring the zoom lens system according to the present invention compacter, it is therefore preferable to compose the zoom lens system of lens components in a number as small as possible so that airspaces as wide as possible can be reserved for moving lens units which are to be moved for zooming.

In order that the wide-angle zoom lens system having a high vari-focal ratio according to the present invention allows small variations of aberrations and has stable or high imaging performance within an overall zooming range of vari-focal range, it is desirable to compose the second lens unit, in order from the object side, of a negative lens component which has an image side surface having high curvature, a negative lens component which has an object side surface having a radius of curvature $r_{22F}$ satisfying the following condition (4) and a positive lens component:

(4) $-0.36 < f_W/r_{22F} < 0.20$ wherein the reference symbol $f_W$ represents a focal length of the zoom lens system as a whole at the wide position thereof.

If the upper limit of the condition (4) is exceeded, the zoom lens system will undesirably tend to allow remarkable variations of spherical aberration and coma to be caused by changing a magnification of the zoom lens system. If the lower limit of the condition (4) is exceeded, in contrast, the zoom lens system will undesirably tend to allow remarkable variations of astigmatism and distortion to be caused in particular on marginal portions of an image surface.

Moreover, it is desirable for the zoom lens system according to the present invention to use an aspherical surface which has a negative refractive power weakened from the optical axis toward marginal portions thereof as an air-contact surface, in particular as an image side air-contact surface, of the positive lens component since use of such an aspherical surface on the positive lens component makes it possible to obtain high image quality over an entire range from a central portion to marginal portions of the image surface.

It is necessary for the zoom lens system according to the present invention to reduce variations of aberrations which are to be caused by moving the third lens unit.

It is desirable for the third lens unit that it is composed of two or three lens units including a positive lens component disposed on the object side and a negative lens component having a strongly concave surface on the image side, and that the negative lens component having the strongly concave surface on the image side satisfies the following condition (5):

(5) $0.5 < (r_{3NF} + r_{3NR})/(r_{3NF} - r_{3NR}) < 5$ wherein the reference symbols $r_{3NF}$ and $r_{3NR}$ represent radii of curvature on an object side surface and the image side surface of the negative lens component disposed in the third lens unit.

The condition (5) defines a shape of the negative lens component disposed in the third lens unit. Speaking concretely of the condition (5), it is possible to shorten a back focal length of the zoom lens system or configure the lens system compacter by selecting a radius of curvature on the object side surface of the negative lens component which is shorter than that on the image side surface thereof so as to shift a principal point of the third lens unit as a whole toward the object side. If the upper limit of the condition (5) is exceeded, an effect undesirable for configuring the zoom lens system compact will result in. If the lower limit of the condition (5) is exceeded, in contrast, the radius of curvature on the image side surface will be too short, and this surface will produce negative aberrations and aberrations of high orders in large amounts.

Further, the variations of aberrations which are to be caused by moving the third lens unit can be reduced to very low levels when the positive lens component disposed in the third lens unit also uses a single or a plurality of aspherical surfaces which have positive refractive powers weakened from the optical axis toward marginal portions thereof.

Further, an effect which is similar to that obtainable by selecting the above-described composition of the third lens unit can be obtained by composing the fourth lens unit of a single positive lens component. It is desirable for favorable correction of aberrations to configure the positive lens component so as to satisfy the following condition (6):

(6)  $-5 < (r_{4F} + r_{4R})/(r_{4F} - r_{4R}) < 0.1$ wherein the reference symbols $r_{4F}$ and $r_{4R}$ represent radii of curvature on an object side surface and an image side surface respectively of the positive lens component disposed in the fourth lens unit.

The condition (6) defines a shape of the positive lens component disposed in the fourth lens unit. The fourth lens unit has a main role to correct a shift of the image surface which is caused by moving the second lens unit and the third lens unit. When the fourth lens unit is configured so as to have a shape defined by the condition (6), the positive lens component disposed in the fourth lens unit functions to cancel aberrations which are produced by the image side surface having a short radius of curvature of the third lens unit and can favorably correct offaxial aberrations in particular.

If the upper limit of the condition (6) is exceeded, the positive lens component disposed in the fourth lens unit will have too long a radius of curvature on the object side surface thereof and a weakened function thereof to cancel the aberrations which are produced by the surface of the third lens unit disposed in opposition to the positive lens component and having the short radius of curvature, thereby resulting in an effect undesirable for enhancing imaging performance of the zoom lens system. If the lower limit of the condition (6) is exceeded, in contrast, the image side surface of the fourth lens unit will produce remarkable outer coma, etc. and it will be impossible to obtain a good image quality over the entire range of the image surface including marginal portions thereof.

In addition, the aspherical surfaces which are to be used in the zoom lens system according to the present invention have shapes expressed by the formula shown below:

$$x = \frac{y^2/r}{1 + \sqrt{1 - p(y/r)^2}} + A_2 y^2 + A_4 y^4 + A_6 y^6 + A_8 y^8 + A_{10} y^{10} + \ldots$$

wherein the reference symbol x represents an abscissa taken in the direction of the optical axis, the reference symbol y designates an ordinate taken in a direction perpendicular to the optical axis, the reference symbol r denotes a radius of curvature as measured on the optical axis, the reference symbols $A_2$, $A_4$, $A_6$, $A_8$, $A_{10}$, ... represent aspherical surface coefficients, and the reference symbol p designates a conical constant.

BRIEF DESCRIPTION OF THE DRAWINGS

FIG. 4 shows graphs illustrating aberration characteristics at a wide position of the first embodiment of the present invention;

FIG. 5 shows graphs illustrating aberration characteristics at an intermediate focal length of the first embodiment of the present invention;

FIG. 6 shows graphs illustrating aberration characteristics at a tele position of the first embodiment of the present invention;

FIG. 7 shows curves illustrating aberration characteristics at the wide position of the second embodiment of the present invention;

FIG. 8 shows curves illustrating aberration characteristics at the intermediate focal length of the second embodiment of the present invention;

FIG. 9 shows curves illustrating aberration characteristics at the tele position of the second embodiment of the present invention;

FIG. 10 shows graphs visualizing aberration characteristics at the wide position of the third embodiment of the present invention;

FIG. 11 shows graphs visualizing aberration characteristics at the intermediate focal length of the third embodiment of the present invention; and FIG. 12 shows graphs visualizing aberration characteristics at the tele position of the third embodiment of the present invention.

DETAILED DESCRIPTION OF THE PREFERRED EMBODIMENTS

Figure 1A:
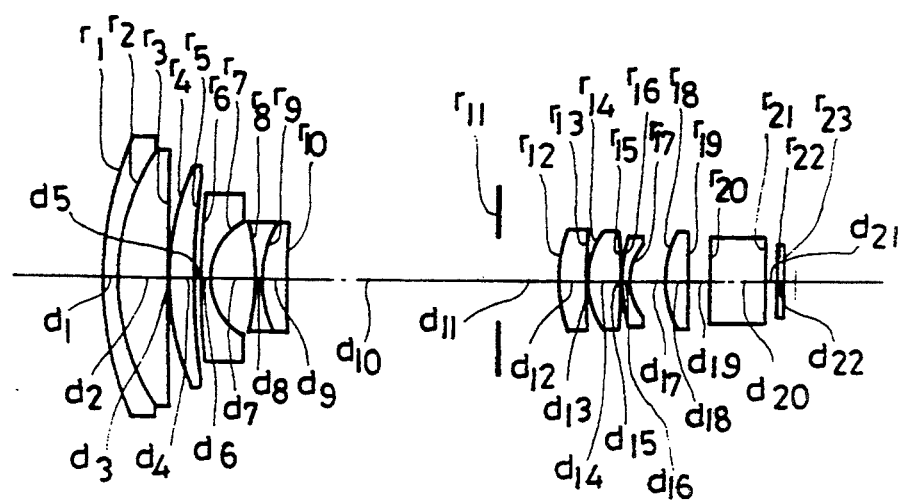
FIG. 1 through FIG. 3 show sectional views illustrating compositions of a first embodiment through a third embodiment of the zoom lens system according to the present invention.

Now, the zoom lens system according to the present invention will be described more detailedly below with reference to the preferred embodiments thereof illustrated in the accompanying drawings and given in the form of the following numerical data:

Embodiment 1

$f = 5.15 \sim 17 \sim 60$,  $F/1.8 \sim 2.3 \sim 2.4$,  $2\omega = 64.6° \sim 6°$ $r_1 = 36.0900$
$\quad d_1 = 1.5000 \quad n_1 = 1.84666 \quad \nu_1 = 23.78$
$r_2 = 23.6260$
$\quad d_2 = 5.4900 \quad n_2 = 1.60311 \quad \nu_2 = 60.70$
$r_3 = 409.8790$
$\quad d_3 = 0.1500$
$r_4 = 27.8260$
$\quad d_4 = 2.6200 \quad n_3 = 1.60311 \quad \nu_3 = 60.70$
$r_5 = 73.0800$
$\quad d_5 = D_1$
$r_6 = 73.0800$
$\quad d_6 = 1.0000 \quad n_4 = 1.69680 \quad \nu_4 = 55.52$
$r_7 = 6.6070$
$\quad d_7 = 4.9300$
$r_8 = -24.0550$
$\quad d_8 = 0.8000 \quad n_5 = 1.48749 \quad \nu_5 = 70.20$
$r_9 = 13.1560$
$\quad d_9 = 2.5500 \quad n_6 = 1.80518 \quad \nu_6 = 25.43$
$r_{10} = 45.9518$ (aspherical surface)
$\quad d_{10} = D_2$
$r_{11} = \infty$ (stop)
$\quad d_{11} = D_3$
$r_{12} = 14.4743$ (aspherical surface)
$\quad d_{12} = 2.9200 \quad n_7 = 1.66524 \quad \nu_7 = 55.12$
$r_{13} = 74.6400$
$\quad d_{13} = 0.1500$
$r_{14} = 8.8810$
$\quad d_{14} = 3.6100 \quad n_8 = 1.60311 \quad \nu_8 = 60.70$ -continued

| | | | |
|---|---|---|---|
| $r_{15} = -82.1610$ | | | |
| | $d_{15} = 0.1700$ | | |
| $r_{16} = 16.4390$ | | | |
| | $d_{16} = 0.8000$ | $n_9 = 1.84666$ | $v_9 = 23.78$ |
| $r_{17} = 5.7390$ | | | |
| | $d_{17} = D_4$ | | |
| $r_{18} = 11.5900$ | | | |
| | $d_{18} = 2.4300$ | $n_{10} = 1.69680$ | $v_{10} = 55.52$ |
| $r_{19} = 272.1140$ | | | |
| | $d_{19} = D_5$ | | |
| $r_{20} = \infty$ | | | |
| | $d_{20} = 6.0000$ | $n_{11} = 1.54771$ | $v_{11} = 62.83$ |
| $r_{21} = \infty$ | | | |
| | $d_{21} = 1.2100$ | | |
| $r_{22} = \infty$ | | | |
| | $d_{22} = 0.7500$ | $n_{12} = 1.48749$ | $v_{12} = 70.20$ |
| $r_{23} = \infty$ | | | | aspherical surface coefficient (10th surface)
$P = 1.0000, A_2 = 0, A_4 = -0.90419 \times 10^{-4}$,
$A_6 = -0.33074 \times 10^{-6}, A_8 = -0.17322 \times 10^{-7}$,
$A_{10} = 0.57903 \times 10^{-10}$ (12th surface)
$P = 1.0000, A_2 = 0, A_4 = -0.12676 \times 10^{-3}$,
$A_6 = 0.73007 \times 10^{-6}, A_8 = -0.68593 \times 10^{-7}$,
$A_{10} = 0.86365 \times 10^{-9}$

| f | 5.15 | 17 | 60 |
|---|---|---|---|
| $D_1$ | 0.800 | 13.142 | 23.030 |
| $D_2$ | 23.730 | 11.388 | 1.500 |
| $D_3$ | 6.140 | 1.500 | 1.500 |
| $D_4$ | 3.980 | 5.625 | 9.780 |
| $D_5$ | 2.370 | 5.365 | 1.210 |

$|x_{3W} - x_{3T}|/f_W = 0.90, |f_2|/f_1 = 0.213, f_4/f_3 = 0.854, f_W/r_{22F} = -0.214, (r_{3NF} + r_{3NR})/(r_{3NF} - r_{3NR}) = 2.07, (r_{4F} + r_{4R})/(r_{4F} - r_{4R}) = -1.09$

Embodiment 2

$f = 3.65 \sim 10.32 \sim 29.2, F/1.8 \sim 2.1 \sim 2.9, 2\omega = 67.6° \sim 4.6°$

| | | | |
|---|---|---|---|
| $r_1 = 32.2988$ | | | |
| | $d_1 = 1.0000$ | $n_1 = 1.84666$ | $v_1 = 23.78$ |
| $r_2 = 20.4603$ | | | |
| | $d_2 = 4.0845$ | $n_2 = 1.60311$ | $v_2 = 60.70$ |
| $r_3 = 6546.0829$ | | | |
| | $d_3 = 0.1500$ | | |
| $r_4 = 18.8069$ | | | |
| | $d_4 = 2.4325$ | $n_3 = 1.56384$ | $v_3 = 60.69$ |
| $r_5 = 52.0984$ | | | |
| | $d_5 = D_1$ | | |
| $r_6 = 52.4371$ | | | |
| | $d_6 = 0.7000$ | $n_4 = 1.77250$ | $v_4 = 49.66$ |
| $r_7 = 4.8877$ | | | |
| | $d_7 = 3.3502$ | | |
| $r_8 = -24.3828$ | | | |
| | $d_8 = 0.7000$ | $n_5 = 1.48749$ | $v_5 = 70.20$ |
| $r_9 = 8.9707$ | | | |
| | $d_9 = 2.1000$ | $n_6 = 1.80518$ | $v_6 = 25.43$ |
| $r_{10} = 29.1234$ (aspherical surface) | | | |
| | $d_{10} = D_2$ | | |
| $r_{11} = \infty$ (stop) | | | |
| | $d_{11} = D_3$ | | |
| $r_{12} = 5.5910$ (aspherical surface) | | | |
| | $d_{12} = 3.5000$ | $n_7 = 1.66910$ | $v_7 = 55.40$ |
| $r_{13} = -12.4801$ (aspherical surface) | | | |
| | $d_{13} = 0.1500$ | | |
| $r_{14} = 34.8847$ | | | |
| | $d_{14} = 0.7464$ | $n_8 = 1.80518$ | $v_8 = 25.43$ |
| $r_{15} = 5.0104$ | | | |
| | $d_{15} = D_4$ | | |
| $r_{16} = 10.3129$ | | | |
| | $d_{16} = 1.7000$ | $n_9 = 1.56384$ | $v_9 = 60.69$ |
| $r_{17} = -39.1480$ | | | |
| | $d_{17} = D_5$ | | |
| $r_{18} = \infty$ | | | |
| | $d_{18} = 4.5000$ | $n_{10} = 1.51633$ | $v_{10} = 64.15$ |
| $r_{19} = \infty$ | | | |
| | $d_{19} = 1.0000$ | | |
| $r_{20} = \infty$ | | | |
| | $d_{20} = 1.0000$ | $n_{11} = 1.48749$ | $v_{11} = 70.20$ |
| $r_{21} = \infty$ | | | | aspherical surface coefficient (10th surface)
$P = 1.0000, A_2 = 0, A_4 = -0.27972 \times 10^{-3}$,
$A_6 = 0.42085 \times 10^{-5}, A_8 = -0.37506 \times 10^{-6}$,
$A_{10} = 0$ (12th surface)
$P = 1.0000, A_2 = 0, A_4 = -0.62959 \times 10^{-3}$,
$A_6 = -0.89037 \times 10^{-5}, A_8 = 0.11052 \times 10^{-7}$,
$A_{10} = 0$ (13th surface)
$P = 1.0000, A_2 = 0, A_4 = 0.82473 \times 10^{-3}$,
$A_6 = -0.14364 \times 10^{-4}, A_8 = 0.82645 \times 10^{-6}$,
$A_{10} = 0$

| f | 3.65 | 10.32 | 29.2 |
|---|---|---|---|
| $D_1$ | 0.500 | 9.276 | 13.782 |
| $D_2$ | 14.282 | 5.506 | 1.000 |
| $D_3$ | 6.670 | 5.155 | 1.000 |
| $D_4$ | 1.579 | 1.177 | 2.339 |
| $D_5$ | 1.864 | 3.780 | 6.773 |

$|x_{3W} - x_{3T}|/f_W = 1.55, |f_2|/f_1 = 0.203, f_4/f_3 = 1.05, f_W/r_{22F} = -0.150, (r_{3NF} + r_{3NR})/(r_{3NF} - r_{3NR}) = 1.34, (r_{4F} + r_{4R})/(r_{4F} - r_{4R}) = -0.58$

Embodiment 3

$f = 3.65 \sim 10.32 \sim 29.2, F/1.8 \sim 2.0 \sim 2.8, 2\omega = 67.6° \sim 4.6°$

| | | | |
|---|---|---|---|
| $r_1 = 26.4187$ | | | |
| | $d_1 = 1.0000$ | $n_1 = 1.80518$ | $v_1 = 25.43$ |
| $r_2 = 17.1112$ | | | |
| | $d_2 = 4.4302$ | $n_2 = 1.60311$ | $v_2 = 60.70$ |
| $r_3 = 109.0965$ | | | |
| | $d_3 = 0.1500$ | | |
| $r_4 = 17.9502$ | | | |
| | $d_4 = 2.1290$ | $n_3 = 1.58913$ | $v_3 = 61.18$ |
| $r_5 = 47.6496$ | | | |
| | $d_5 = D_1$ | | |
| $r_6 = 47.5915$ | | | |
| | $d_6 = 0.7000$ | $n_4 = 1.69680$ | $v_4 = 55.52$ |
| $r_7 = 4.2407$ | | | |
| | $d_7 = 2.4114$ | | |
| $r_8 = -32.9310$ | | | |
| | $d_8 = 0.7000$ | $n_5 = 1.60311$ | $v_5 = 60.70$ |
| $r_9 = 13.4892$ | | | |
| | $d_9 = 1.9600$ | $n_6 = 1.80518$ | $v_6 = 25.43$ |
| $r_{10} = 108.5932$ (aspherical surface) | | | |
| | $d_{10} = D_2$ | | |
| $r_{11} = \infty$ (stop) | | | |
| | $d_{11} = D_3$ | | |
| $r_{12} = 5.1939$ (aspherical surface) | | | |
| | $d_{12} = 2.9144$ | $n_7 = 1.58913$ | $v_7 = 61.18$ |
| $r_{13} = -19.8462$ (aspherical surface) | | | |
| | $d_{13} = 0.1333$ | | |
| $r_{14} = 13.7521$ | | | |
| | $d_{14} = 0.8978$ | $n_8 = 1.80518$ | $v_8 = 25.43$ |
| $r_{15} = 4.6304$ | | | |
| | $d_{15} = D_4$ | | |
| $r_{16} = 11.3044$ | | | |
| | $d_{16} = 1.9000$ | $n_9 = 1.58913$ | $v_9 = 61.18$ |
| $r_{17} = -20.2531$ | | | |
| | $d_{17} = D_5$ | | |
| $r_{18} = \infty$ | | | |
| | $d_{18} = 4.5000$ | $n_{10} = 1.51633$ | $v_{10} = 64.15$ |
| $r_{19} = \infty$ | | | |
| | $d_{19} = 1.0000$ | | |
| $r_{20} = \infty$ | | | |
| | $d_{20} = 1.0000$ | $n_{11} = 1.48749$ | $v_{11} = 70.20$ |
| $r_{21} = \infty$ | | | | aspherical surface coefficient (10th surface)
$P = 1.0000, A_2 = 0, A_4 = -0.57161 \times 10^{-3}$,
$A_6 = 0.13706 \times 10^{-4}, A_8 = -0.15716 \times 10^{-5}$,
$A_{10} = 0$ (12th surface)
$P = 1.0000, A_2 = 0, A_4 = -0.78389 \times 10^{-3}$,
$A_6 = -0.13233 \times 10^{-4}, A_8 = 0.13610 \times 10^{-6}$,
$A_{10} = -0.28642 \times 10^{-7}$ (13th surface)

-continued

P = 1.0000, $A_2$ = 0, $A_4$ = 0.38932 × $10^{-3}$,
$A_6$ = −0.31639 × $10^{-5}$, $A_8$ = 0.38301 × $10^{-6}$,
$A_{10}$ = 0

| f | 3.65 | 10.32 | 29.2 |
|---|---|---|---|
| $D_1$ | 0.500 | 9.122 | 13.812 |
| $D_2$ | 14.312 | 5.690 | 1.000 |
| $D_3$ | 6.890 | 5.124 | 1.000 |
| $D_4$ | 1.850 | 1.738 | 3.028 |
| $D_5$ | 2.177 | 4.055 | 6.889 |

$|x_{3W} - x_{3T}|/f_W$ = 1.61, $|f_2|/f_1$ = 0.204, $f_4/f_3$ = 0.80, $f_W/r_{22F}$ = −0.111, $(r_{3NF} + r_{3NR})/(r_{3NF} - r_{3NR})$ = 2.02, $(r_{4F} + r_{4R})/(r_{4F} - r_{4R})$ = −0.28 wherein the reference symbols $r_1$, $r_2$, ... represent radii of curvature on surfaces of respective lens elements, the reference symbols $d_1$, $d_2$, ... designate thicknesses of the respective lens elements and air spaces reserved therebetween, the reference symbols $n_1$, $n_2$, ... denote refractive indices of the respective lens elements, and the reference symbols $\nu_1$, $\nu_2$, ... represent Abbe's numbers of the respective lens elements.

Figure 1B:
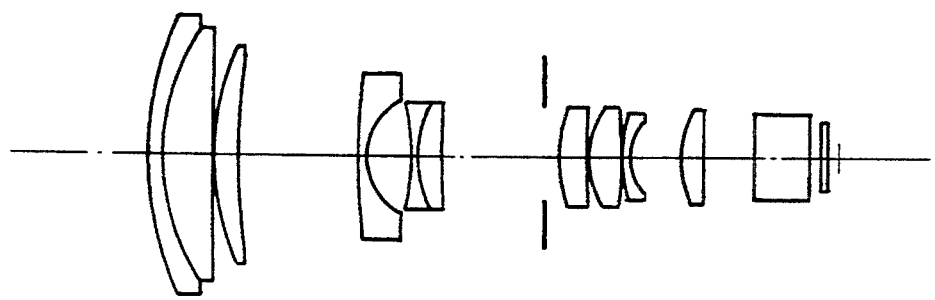
Figure 1C:
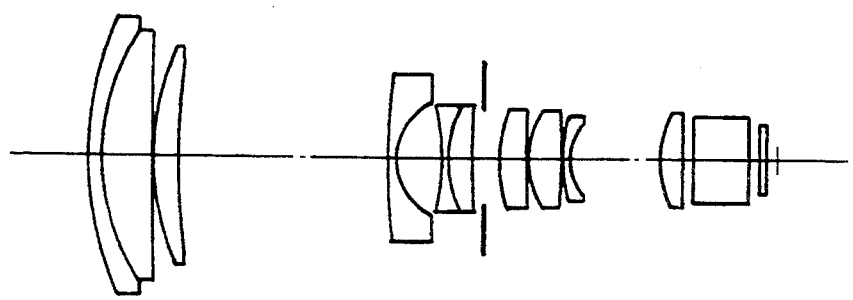
Figure 2A:
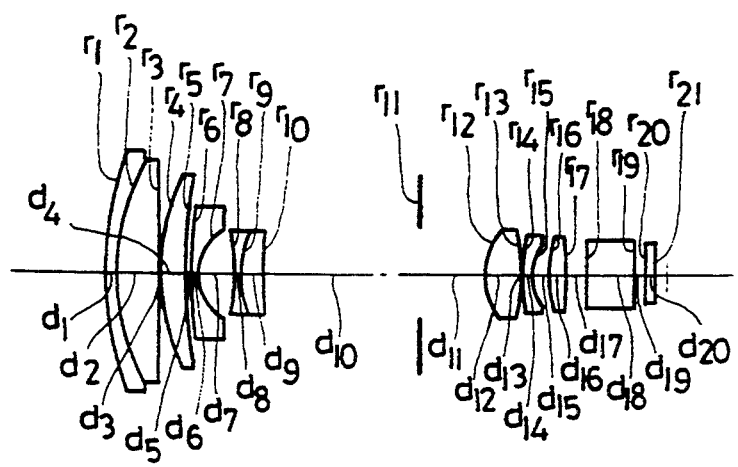
Figure 2B:
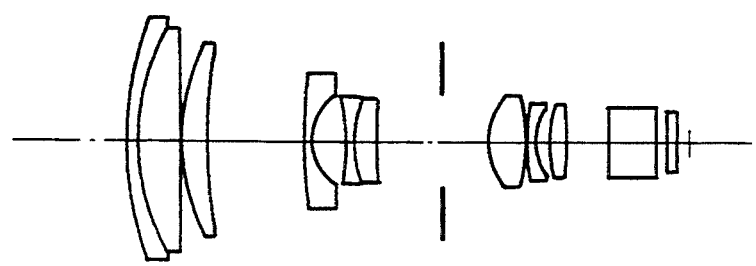
Figure 2C:
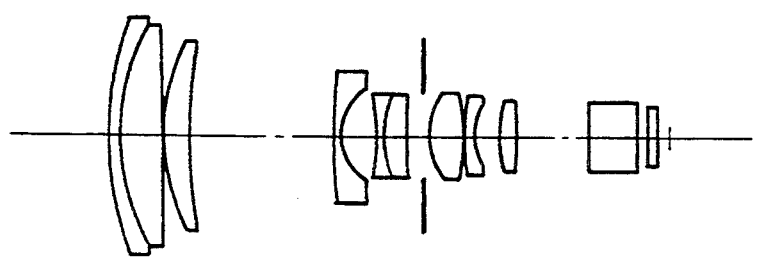
Figure 3A:
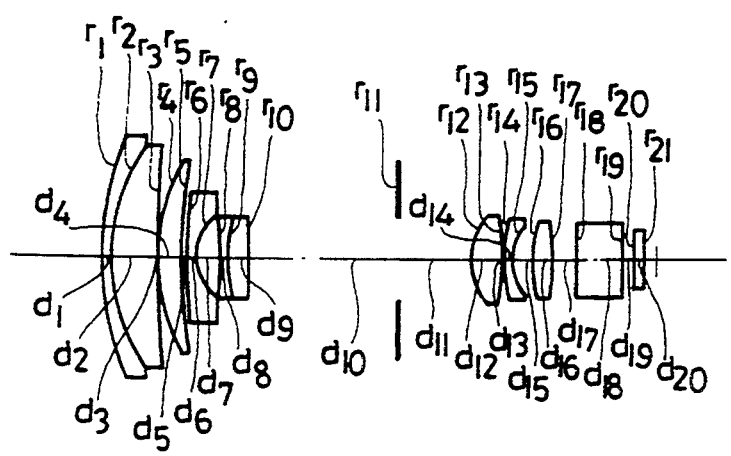
Figure 3B:
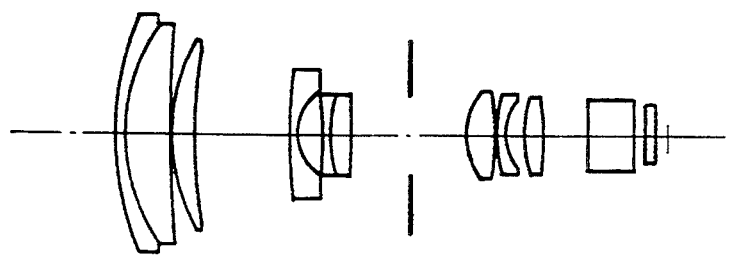
Figure 3C:
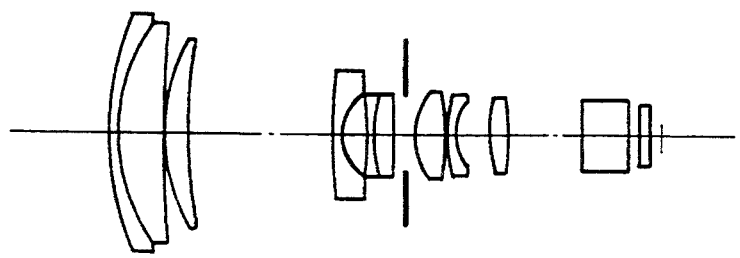

The first embodiment through the third embodiment have compositions illustrated in FIG. 1 through FIG. 3 respectively. Speaking concretely of the first embodiment, the first lens unit consists of three lens elements; in order from the object side, a negative meniscus lens element, a positive meniscus lens element and a positive lens element: the second lens unit consists of three lens elements; in order from the object side, a negative meniscus lens component, and a cemented doublet consisting of a negative lens element and a positive lens element: the third lens unit which is disposed on the image side of the second lens component with an aperture stop interposed therebetween consists of three lens components; a positive lens component, a positive lens component and a negative lens component: and the fourth lens unit consists of a single positive lens component.

In each of the second embodiment and the third embodiment, the first and second lens units have compositions which are the same as those selected for the first embodiment, and the third lens unit which is disposed on the image side of the second lens unit with the aperture stop interposed therebetween consists of a positive lens component and a negative lens component. Further, the fourth lens unit adopted for each of the second embodiment and the third embodiment has a composition which is the same as that selected for the first embodiment.

In the zoom lens system preferred as the first embodiment of the present invention, aspherical surfaces are used as an image side surface of the second lens unit and an object side surface of the third lens unit respectively. In each of the second embodiment and the third embodiment, three aspherical surfaces are used as an image side surface of the second lens unit and both surfaces of the third lens unit.

In addition, the surfaces $r_{20}$ through $r_{23}$ are optical members such as filters in the first embodiment, whereas the surfaces $r_{18}$ through $r_{21}$ are optical members such as filters in the second embodiment and the third embodiment.

The zoom lens system according to the present invention has a high vari-focal ratio of 8 to 12, a wide field angle (2Ω) on the order of 65° to 68° at the wide position thereof and an F number of 1.8. Nevertheless, the zoom lens system according to the present invention consists of lens elements in a small number of 9 or 10, can be manufactured at a low cost and has a compact size.

We claim:

1. A zoom lens system comprising, in order from the object side: a first lens unit which has a positive refractive power and is kept fixed during zooming, a second lens unit which has a negative refractive power, is movable for zooming and has a vari-focal function, an aperture stop, a third lens unit which has a positive refractive power and is movable for zooming, and a fourth lens unit which has a positive refractive power and is movable for zooming; wherein a location of said third lens unit at a tele position of said zoom lens system is on the object side of another location of said third lens unit at a wide position, and wherein said third lens unit satisfies the following condition (1):

(1) $0.5 < |x_{3W} - x_{3T}|/f_W < 3$ wherein the reference symbol $f_W$ represents a focal length of said zoom lens system as a whole at the wide position thereof, and the reference symbol $|x_{3W} - x_{3T}|$ designates a difference in distance between the locations on an optical axis at the wide position and the tele position of said zoom lens system.

2. A zoom lens system according to claim 1 satisfying the following conditions (2) and (3):

(2) $0.1 < |f_2|/f_1 < 0.4$ (3) $0.77 < f_4/f_3 < 2$ wherein the reference symbols $f_1$, $f_2$, $f_3$ and $f_4$ represent focal lengths of said first lens unit, said second lens unit, said third lens unit and said fourth lens unit respectively.

3. A zoom lens system according to claim 1 satisfying the following conditions (2') and (3):

(2') $0.1 < |f_2|/f_1 < 0.22$ (3) $0.77 < f_4/f_3 < 2$ wherein the reference symbols $f_1$, $f_2$, $f_3$ and $f_4$ represent focal lengths of said first lens unit, said second lens unit, said third lens unit and said fourth lens unit respectively.

4. A zoom lens system according to claim 2 or 3 wherein said third lens unit includes, in order from the object side, at least a positive lens component and a negative lens component, and wherein said negative lens component satisfies the following condition (5):

(5) $0.5 < (r_{3NF} + r_{3NR})/(r_{3NF} - r_{3NR}) < 5$ wherein the reference symbols $r_{3NF}$ and $r_{3NR}$ represent radii of curvature on an object side surface and an image side surface respectively of said negative lens component.

5. A zoom lens system according to claim 4 wherein said fourth lens unit consists of a positive lens component and said positive lens component satisfies the following condition (6):

(6) $-5 < (r_{4F} + r_{4R})/(r_{4F} - r_{4R}) < 0.1$ wherein the reference symbols $r_{4F}$ and $r_{4R}$ represent radii of curvature on an object side surface and an image side surface respectively of said positive lens component.

6. A zoom lens system according to claim 5 wherein said second lens unit comprises an aspherical surface having a negative refractive power which is weakened toward marginal portions thereof and said third lens unit comprises at least one aspherical surface having a positive refractive power which is weakened toward marginal portions thereof.

* * * * *